Oct. 13, 1936.  E. VAN DER PYL  2,057,171

ANTISLIPPING TREAD AND FLOOR COVERING AND METHOD OF MAKING THE SAME

Filed Sept. 4, 1934

Witnesses
Gustaf Olson
W R Greenwood

Inventor
EDWARD VAN DER PYL

By Clayton L. Jenks
Attorney

Patented Oct. 13, 1936

2,057,171

UNITED STATES PATENT OFFICE 2,057,171

ANTI-SLIPPING TREAD AND FLOOR COVERING AND METHOD OF MAKING THE SAME

Edward Van der Pyl, Holden, Mass., assignor to Norton Company, Worcester, Mass., a corporation of Massachusetts Application September 4, 1934, Serial No. 742,579

2 Claims. (Cl. 94—5)

This invention relates to treads and floor coverings, and more particularly to safety treads and anti-slipping flooring composed of rubber and to a process of making the same.

Non-slip tread surfacing has been made heretofore by embedding a considerable quantity of loose aggregates of hard anti-slipping, wear-resisting material, such as chips of ceramic bonded abrasive grains, in the outer surface of a sheet of crude rubber containing the necessary vulcanizing ingredients, and thereafter shaping and vulcanizing the mass to form the finished product. These treads have been previously made in the factory to the exact dimensions and shapes required for the particular surfaces to be covered; and that procedure has required an expensive outlay in necessary factory equipment for making and stocking the different sizes.

One object of this invention is to provide an anti-slipping tread or flooring of this general type which may be made in large standard sizes and is of such a construction that it may be readily cut, either in the factory or at the place of use, to form a tread unit or a plurality of tread sections for fitting stairs and floor surfaces of various widths and sizes.

A further object of the invention is to provide a tread construction which may be laid in sections or units in a unitary relation and arrangement so that an entire floor of any size may be covered or only a small section or space thereof.

Further objects will be apparent in the following disclosure.

Referring to the drawing, which illustrates one embodiment of the invention:

Figure 1:
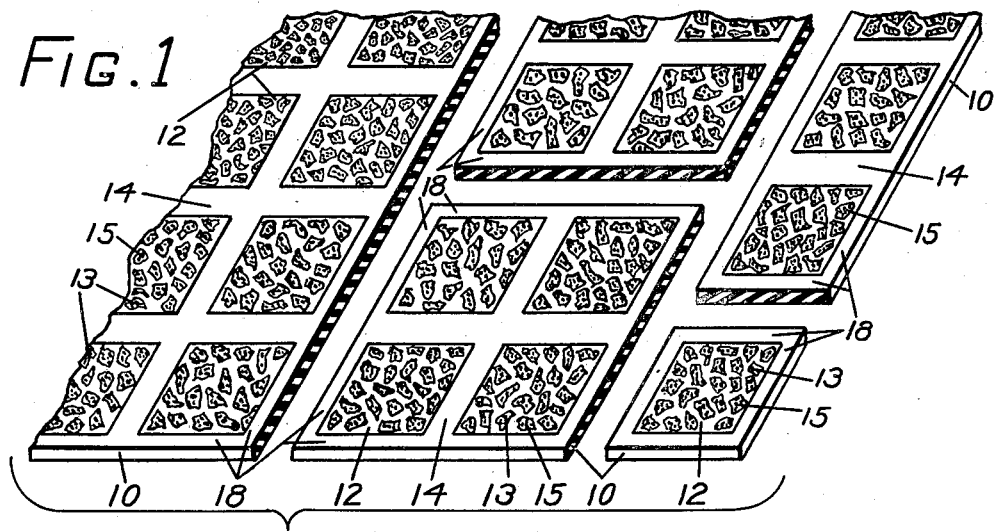
Fig. 1 is an isometric sectional view of a tread construction embodying my invention and illustrating the formation of tread or flooring sections of varying sizes from the main rubber sheet.

In accordance with my invention, I have provided a tread or flooring construction particularly adapted to be laid as a unit or in sections so as to cover either a small space or an entire floor surface, which comprises a strip or sheet of rubber carrying a plurality of geometrical or ornamental portions, such, for example, as squares, at suitable distances apart containing hard, anti-slipping, wear-resisting granules which are uniformly incorporated therein by being embedded in the surface portion of the rubber sheet and solely within the area defined by the surface figures to form an anti-slipping tread surface. The size and shape of the individual surface portions may be varied as desired, and the number thereof contained in the tread surface to form the anti-slipping surface thereof may, of course, be determined to suit the conditions ordinarily encountered in practice; but, to be effective, it is preferred that they cover substantially the entire tread surface of the sheet. The arrangement of these portions, however, is preferably such as to leave substantially narrow, non-abrasive portions or strips of rubber composition alone between the side edges of the adjacent patterns whereby the sheet may be cut to provide tread sections or units which may be readily severed or detached as required.

For the anti-slipping material, I preferably utilize chips or aggregates of abrasive grains bonded with a ceramic material, such as described in the patent to Jeppson No. 1,371,683 of March 15, 1921. These chips preferably consist of a granular material of great hardness and high frictional or wear-resisting characteristics, such as grains of crystalline alumina or silicon carbide, emery, corundum and other substances preferably harder than quartz, bonded with a vitrified ceramic material into an integral mass to form an aggregate chip. However, I find that silicon carbide and crystalline alumina aggregates are best adapted for this purpose and I preferably use the latter material. The anti-slipping aggregates preferably are distributed uniformly throughout the surface portions and so constitute the entire non-slipping portion of the tread surface or such a proportion of the tread area that they will receive substantially all of the frictional wear and so provide a durable and highly wear-resisting, anti-slipping surface.

As illustrated in the drawing, one embodiment of my invention comprises a non-slip tread material consisting of a calendered sheet of a vulcanizable rubber compound 10 carrying a series of spaced surface portions 12, each having a quantity of anti-slipping abrasive chips or aggregates 13 incorporated and embedded therein to provide an anti-slipping tread surface for pedestrian traffic. The portions 12 appear in the tread surface with separating spacing strips or non-abrasive portions 14 of plain vulcanized rubber between the adjacent portions. The chips 13 are embedded in the upper surface of the tread and are sufficient in quantity to take substantially all of the pedestrian wear. The chips 13 may, if desired, be provided with substantially flat faces 15 so as to produce a durable, wear-resisting, plain tread surface which is substantially continuous with the flat top surface of the rubber tread material. Also, the surface portions are preferably of such size and the abrasive chips are incorporated therein in sufficient quantity so as to occupy the major part of its volume in order that the rubber matrix may not be largely exposed to the abrasion of pedestrian footwear. It will be understood that various sizes of the abrasive chips may be utilized which are selected and graded according to the anti-slipping surface desired; however, the size of the granules used depends upon the permitted amount of abrasive action upon footgear. To this end, I find that chips which are screened and sized to accordingly pass through a screen having six meshes to the linear inch but will be retained by one having eight meshes to the linear inch, will prevent slipping and yet not cause material wear on the footgear. The anti-slipping aggregates which I preferably employ are ordinarily composed of from 55 to 75% of aluminum oxide abrasive bonded by a vitrified ceramic material in which the structure of the aggregate is homogeneous, non-glazing, non-oxidizing and unaffected by freezing, moisture or cleaning compounds.

The rubber composition employed for the rubber matrix or main tread body may comprise a rubber mixture consisting of crude or raw rubber and vulcanizing sulphur, with or without suitable coloring pigments and fillers, and may be compounded and proportioned in accordance with standard knowledge in the art to produce a rubber body of the desired degree of vulcanization, according to the properties desired. The rubber base may thus be either a hard rubber of the type of vulcanite or it may be a soft, resilient, flexible body. If the rubber contains 5% or less of combined sulphur by weight, a soft rubber is formed; and if more than 20% of sulphur is present, the resulting body is a hard rubber of the nature of ebonite or vulcanite.

As one method of manufacturing a satisfactory tread or floor covering in accordance with this invention, the anti-slipping aggregates having the desired shape or grit size and preferably having a flat or smooth surface are placed in a suitable mold with the flat or smooth surfaces in contact with the bottom surface of the mold so as to form a layer therein which is substantially of the thickness of a single granule. The aggregate material is preferably so distributed and positioned in the mold as to form any desired ornamental or geometrical configuration. To this end, in order to satisfactorily assure a proper distribution of the aggregates in the design, it is preferred that the flat faces of the aggregates be secured to a sheet of paper or other thin flexible material by means of an adhesive, preferably an aqueous solvent adhesive such as a glue readily soluble in warm water, the aggregates being mounted and arranged thereon preferably to form squares or blocks and held by the paper backing in the desired spaced relationship to each other, and the abrasive portions being spaced and separated on all sides from the adjacent figures by narrow transverse strips of open exposed paper only, without any abrasive being present therein. If desired, the exposed faces of the chips when mounted on the paper may be coated with a coating of rubber in a fluid condition, such as rubber latex or a rubber solution, so that the adhesion between the surfaces of the aggregate and the subsequent rubber bonding material of the tread may be greatly increased.

In order to form the tread, I then fill the mold with the vulcanizable rubber compound for forming the main body of the tread, superimposing the rubber mass over the exposed portions of the aggregate chips and forcing the rubber material therein under pressure to cause it to fill in the spaces or interstices between the chips and surround and embed them and to extend therebetween to the paper strip and thus form the outer tread surface of the finished product. The body thus formed is subsequently vulcanized in accordance with any accepted practice to mature and cure the rubber to the degree of vulcanization desired.

The tread body as thus made presents a tread surface in which the anti-slipping aggregate chips are separately embedded in and firmly held by the rubber mass, thereby forming a firm tread or flooring having a substantially plane, level and varied patterned anti-slipping tread surface. The paper sheet to which the chips were attached may be suitably removed from the molded body, as by being dampened with water until the adhesive substance is softened sufficiently to permit removal of the sheet of paper from the faces of the aggregate chips.

Figure 2:
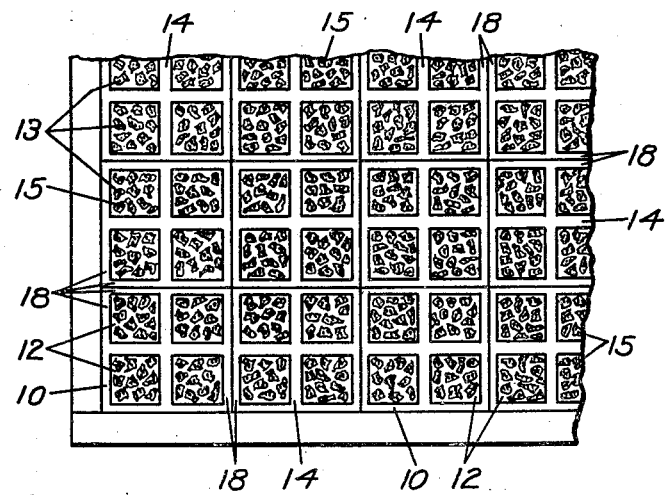
Fig. 2 is a plan view of a portion of a floor covering embodying the invention comprising tread sections each consisting of four abrasive areas.
Figure 3:
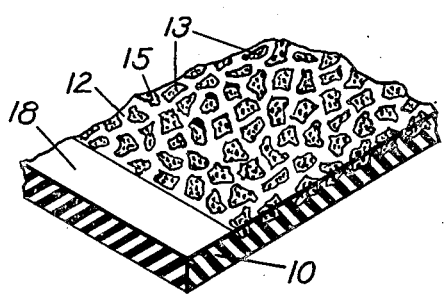
Fig. 3 is a fragmentary perspective view, partly in section, of a tread or flooring construction embodying the novel features of my invention.

The tread structure thus formed and comprising the main body sheet 10 may then be severed along longitudinally or transverse extending, parallel lines to make a plurality of tread strips of various desired sizes each having one or more anti-slipping portions 12, the severing of the sheet 10 being along the center lines of the non-abrasive separating or spacing strips 14, thereby leaving spaces 18 between the abrasive portions and the side edge of the severed body of one-half the width of the non-abrasive portions between the adjacent abrasive portions to form a margin or border thereon. When the severed sections are placed side by side, as shown in Fig. 2, and joined together to form a flooring construction, the spaces or borders 18 come opposite each other and form spaces partly in one and partly in the other section of the full size and uniform width as between the other abrasive portions carried by the respective section. It is to be understood that the chips of the order of size specified above are so large that they can not be displaced laterally by a cutting knife; hence the tread can be cut only through the strips of rubber which are free from the abrasive. This invention therefore applies primarily to a tread comprising these large chips which are of such a size as to prevent the tread from being cut directly therethrough, and the claims are to be interpreted accordingly.

It will, therefore, be seen that a tread unit or a plurality of tread sections may, in accordance with this invention, be detached as desired from the main tread sheet 10 and be laid in position on floors of various dimensions. The tread may be colored as desired in manufacture to develop decorative effects and not show permanent dirt stains where the tread may be subjected to conditions of use where mud or dirt rubbed off footgear by the aggregates appears very noticeable. These sections may be applied to a flooring in any suitable manner, such as by nailing, screwing or cementing them in position.

This new tread is particularly suitable for indoor and outdoor use and it permanently maintains its anti-slipping properties when wet or dry. Various modifications of this invention will be obvious, and it is intended that such shall be covered by my invention within the scope of the claims appended hereto.

Having thus described my invention, what I claim as new and desire to secure by Letters Patent is:

1. An anti-slipping tread and floor covering comprising a unitary body of vulcanized rubber having a plurality of spaced, small sized, anti-slipping portions in its top surface forming a considerable part of its tread surface, each of said portions containing a layer of large anti-slipping aggregate chips of ceramic bonded abrasive grains embedded in the rubber body, the anti-stripping portions being separated in spaced relationship from each other and enclosed by strips of said rubber body which are free from abrasive material, said non-abrasive strips extending longitudinally and transversely from edge to edge of said surface and intersecting to form a network in which the strips are located on each side of and between the adjacent anti-slipping portions, thereby providing spaces whereby the article may be cut to produce various desired sizes of tread and flooring sections which may be readily detached as required.

2. An anti-slipping tread and floor covering of the type claimed in claim 1 in which the anti-slipping material comprises granules of crystalline alumina bonded by a vitrified clay material.

EDWARD VAN DER PYL.